(12) United States Patent
Kim et al.

(10) Patent No.: US 6,275,504 B1
(45) Date of Patent: Aug. 14, 2001

(54) DIRECT MEMORY READ AND CELL TRANSMISSION APPARATUS FOR ATM CELL SEGMENTATION SYSTEM

(75) Inventors: Chan Kim; Jong Arm Jun; Kyou Ho Lee; Hyup Jong Kim; Jae Geun Kim, all of Daejeon (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/138,329

(22) Filed: Aug. 24, 1998

(30) Foreign Application Priority Data

Nov. 28, 1997 (KR) .................................. 97-64109

(51) Int. Cl.[7] ...................................................... H04J 3/16
(52) U.S. Cl. .......................................... 370/471; 370/474
(58) Field of Search .................................. 370/471, 473, 370/474, 505, 506

(56) References Cited

U.S. PATENT DOCUMENTS

| | | | |
|---|---|---|---|
| 5,548,587 | 8/1996 | Bailey et al. | 370/474 |
| 5,633,870 | 5/1997 | Gaytan et al. | 370/395 |
| 5,845,153 | * 12/1998 | Sun et al. | 370/474 |

OTHER PUBLICATIONS

C. Brendan S. Traw, et al., "Hardware/Software Organization of a High–Performance ATM Host Interface", IEEE Journal on Selected Areas in Communications, vol. 11, No. 2, Feb. 1993, pp. 240–253.

Gerald W. Neufeld et al., "Parallel Host Interface for an ATM Network", IEEE Network, Jul. 1993, pp. 24–34.

* cited by examiner

Primary Examiner—Salvatore Cangialosi
(74) Attorney, Agent, or Firm—Jacobson Holman, PLLC

(57) ABSTRACT

A direct memory read and cell transmission apparatus for an ATM cell segmentation system having a host CPU is disclosed. The segmentation circuit of the apparatus transfers the address and size for the start of the DMA by the byte unit. When a predetermined information is provided, and a DMA read is requested, the data is transferred through the bus of the word unit such as the PCI interface, and then necessary bytes are obtained for thereby forming a 32 bit word stream, so that the ATM cell of a 32 bit×12 word form and transfers to the lower circuit. Therefore, when the segmentation circuit processes the buffer, all data are computed by the byte unit, and in an application program, the data are not obtained for transmitting the data to the ATM cell, so that it is possible to enhance the processing capability.

12 Claims, 5 Drawing Sheets

CELL HEADER

CPCS-PDU PAYLOAD

PADDING BYTES

TRAILER,CRC32 (4+4)

▨ CELL HEADER

▦ CPCS-PDU PAYLOAD

▧ PADDING BYTES

▩ TRAILER,CRC32 (4+4)

FIG.4A

| | | | | OFFSET | SIZE |
|---|---|---|---|---|---|
| 79206C | | 21 | 20 | 1F | 0 2 |
| 792068 | 1E | 1D | 1C | 1B | 0 4 |
| 792064 | 1A | 19 | 18 | 17 | 0 4 |
| 792060 | 16 | 15 | 14 | 13 | 0 4 |
| 79205C | 12 | | | | 3 1 |

79025F 16BYTE FROM

FIG.4B

| | | | | | |
|---|---|---|---|---|---|
| BA0054 | | | 11 | 10 | 0 2 |
| BA0050 | F | E | D | C | 0 4 |
| BA004C | B | A | 9 | 8 | 0 4 |
| BA0048 | 7 | 6 | 5 | 4 | 0 4 |
| BA0044 | 3 | 2 | 1 | | 1 3 |

WORD ALIGNMENT OF ALIGNMENT UNIT
FROM BA0045 TO 17BYTES

FIG.4C

| | | | |
|---|---|---|---|
| | | | 21 |
| 20 | 1F | 1E | 1D |
| 1C | 1B | 1A | 19 |
| 18 | 17 | 16 | 15 |
| 14 | 13 | 12 | 11 |
| 10 | F | E | D |
| C | B | A | 9 |
| 8 | 7 | 6 | 5 |
| 4 | 3 | 2 | 1 |

OUTPUT RESULT OF
ALIGNMENT UNIT

DIRECT MEMORY READ AND CELL TRANSMISSION APPARATUS FOR ATM CELL SEGMENTATION SYSTEM

BACKGROUND OF THE INVENTION

1. Field of the Invention

The present invention relates to a direct memory read and cell transmission apparatus for an ATM (Asynchronous Transfer Mode) cell segmentation system, and in particular, to an improved direct memory read and cell transmission apparatus for an ATM cell segmentation system which is capable of directly reading and transmitting data from a PCI (Peripheral Component Interface) BUS of the system to which an ATM cell segmentation system is attached, whereby it is possible to receive word data stream with start address and size information given in byte unit by receiving bytes from the data formed in another word unit and forming an ATM cell using other information and further implementing automatic padding and stop request handling.

2. Description of the Conventional Art

In the conventional art, the data to be transmitted are transferred to an external local memory, and an ATM processing circuit processes the data of the local memory based on a segmentation method. In this method, since a host CPU (Central Processing Unit) moves the data of a host memory to the local memory, it takes much time from the CPU for data movement.

Another method is recently disclosed, in which the ATM processing circuit actively reads data from the host memory, forms ATM cell, and then sends it to network. In this case, the host CPU transfers a control information, which corresponds to the position of the data to be transmitted, to the ATM processing circuit based on a queue, etc. In this method, in the case that the host data bus is 32 bits or 64 bits wide, since the transmit data of the host memory is not word aligned, the data can not be processed. In this case, the host CPU disadvantageously moves the data to a temporary position for aligning the data in 32 bit form. In addition, if the data to be carried by a cell is not located in a contiguous location in memory, the CPU should gather and aligne such data in the contiguous location to make the DMA information is divided between cell boundaries. In addition, the size of bytes to be padded should be computed and transferred as a control information. In this schem, the host CPU is involved in moving all, the data for word alignment and data gathering and computes the size of padding bytes, whereby the processing time of the CPU is extended.

SUMMARY OF THE INVENTION

Accordingly, it is an object of the present invention to provide a direct memory read and cell transmission apparatus for an ATM cell segmentation system which overcomes the aforementioned problems encountered in the conventional art.

It is another object of the present invention to provide a direct memory read and cell transmission apparatus for an ATM cell segmentation with which it is possible to let the CPU handle the transferring of a minimum control information and receiving of a status information which are used for a data transmission in such a way that the data of a CPCS-PDU (Common Convergence Sublayer-Protocol Data Unit) which is segmented into ATM cells remains as is in a host memory, so that major data transfer operation is implemented by a function unit having a direct memory access (DMA) master function for thereby gaining high performance based on a minimum use of the CPU.

It is another object of the present invention to provide a direct memory read and cell transmission apparatus for an ATM cell segmentation system which is capable of enhancing a DMA read function so that the data to be transmitted are in the host memory.

In order to achieve the above objects, there is provided a direct memory read and cell transmission apparatus for an ATM cell segmentation system according to a first embodiment of the present invention which includes a read controller for requesting a PCI memory read using a start address and byte size of an external transmission data of a host memory and reading and transferring a data from a peripheral component internal access interface; an alignment unit for extracting a predetermined byte from a data of the word unit externally transmitted together with an output signal from the read controller and aligning the same; a cell transmission unit for transmitting a byte remaining in the alignment unit in accordance with a cell transmission request signal from the read controller; a cell FIFO unit for storing the aligned word data in accordance with a write signal from the alignment unit and outputting the internal data in accordance with a read signal outputted from the cell transmission unit; an error detecting code generator for detecting an error of the signal outputted from the cell transmission unit; and a selection unit for selectively outputting an external signal, an output signal from the FIFO unit and an output signal from the cell transmission unit in accordance with a selection signal from the cell transmission unit.

In order to achieve the above objects, there is provided a direct memory read and cell transmission apparatus for an ATM cell segmentation system according to a second embodiment of the present invention which includes a segmentation circuit for reading/writing an information written in a local memory, interpreting the information, extracting an information used for combining the information and cell which are necessary for the DMA and transferring to a DMA read and cell combining circuit; and a DMA read and cell combining circuit for receiving an information used for the DMA and an information used for a cell combining operation from the segmentation circuit, generates a cell using the data transferred from the host memory, generating a cell using a data transferred from the host memory and a data used for the cell combining operation and then transferring to the segmentation circuit.

In order to achieve the above objects, there is provided a direct memory read and cell transmission apparatus for an ATM cell segmentation system according to a second embodiment of the present invention which includes a segmentation circuit for reading/writing an information from a local memory, interpreting the information, extracting an information used for combining an information and cell used for the DMA and transferring to the DMA read and cell combining circuit; and a DMA read and cell combining circuit for receiving an information used for the DMA and an information used for the cell combining operation from the segmentation circuit, performing a DMA reading operation, generating a cell using the data transmitted from the host memory and used for the cell combining operation and transferring to the segmentation circuit.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4A through 4C are views illustrating input/output signals of the alignment unit of FIG. 1 according to the present invention.

DETAILED DESCRIPTION OF THE INVENTION

Figure 1:
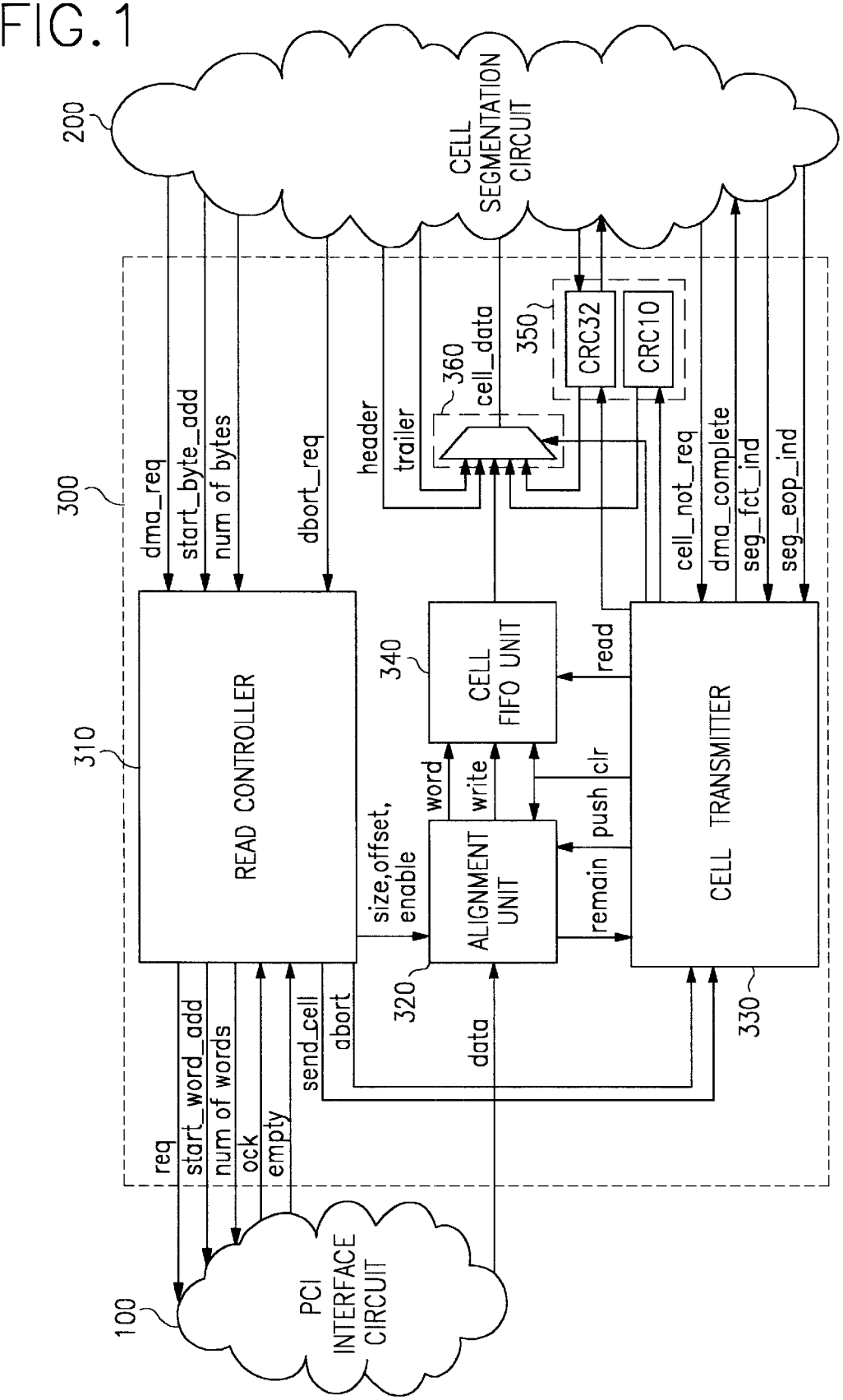
FIG. 1 is a block diagram illustrating a direct memory read and cell transmission apparatus for an ATM cell segmentation system according to the present invention.

As shown in FIG. 1, the direct memory read and cell transmission apparatus for an ATM cell segmentation according to the present invention includes a read controller 310 for requesting a PCI memory read using a start address and the size of bytes of a host memory transferred from a cell segmentation circuit 200 and reading a transferring a data from the PCI bus, an alignment unit 320 for extracting and aligning a needed bytes from the data which is formed in word unit and transferred from a PCI bus interface circuit 100 together with an enable signal, an offset signal and a byte size from the read controller 310 and outputting a 32 bit word data, a cell transmitter 330 for transmitting bytes remaining in the alignment unit 320 if any in accordance with a cell transmission request signal from the read controller 320, a cell FIFO unit 340 for storing the internal data in accordance with a write signal from the alignment unit 320 and outputting the internal data in accordance with a read signal from the cell transmitter 300, an error detecting code generator 350 for generating CRC values for the cell data, and a selector 360 for selectively outputting a signal from the cell segmentation circuit 200, an output signal from the cell FIFO unit 340 and an output signal from the cell transmitter 330 to the cell segmentation circuit in accordance with a selection signal from the cell transmitter 330.

The error detecting code generator 350 includes a CRC10 (Cyclic Redundancy Check 10) for transferring a computation value which is used for detecting an error of the output signal from the cell transmitter 330 to a selector 360 together with an output signal from the cell transmitter 330, and a CRC32 (Cyclic Redundancy Check 32) for transferring a computation value used for detecting an error of the output signal from the cell transmitter 330, a computation value used for detecting an error of AAL 5 of the signal from the cell segmentation circuit 200, an output signal from the cell transmitter 330 and a signal from the cell segmentation circuit 200.

The PCI bus interface circuit 100 requests a use right of the PCI bus, receives a permission from a PCI bus arbiter (not shown) and reads a data of a predetermined memory.

The cell segmentation circuit 200 extracts a DMA parameter using the contents of a VC table and a buffer descriptor of the connection selected according to a scheduling algorithm using a control information stored in the local memory and requests a DMA read.

The direct memory read and cell transmission apparatus 300 receives a DMA read request from the cell segmentation circuit 200, transfers the request to the PCI interface circuit 100, combines the thusly received data and other information for thereby generating an ATM cell and transferring the same to the segmentation circuit 300.

The cell segmentation circuit 200 processes the segmentation by the buffer unit which exists in a predetermined position of the PCI memory, and the information with respect to the buffer is received in the form of a buffer descriptor from the host CPU. The cell segmentation circuit 200 transmits the contents of one buffer and returns the buffer descriptor, which was being used, to the free list and then transmits the next buffer. When providing the service, according to the ATM adaptation layer type, and the size of the bytes existing in the buffer positioned in the frontmost portion of the connection,and in AAL type 5 case, with the information whether the buffer contains the end of the packet, an information is extracted, which is used for forming the size of the bytes for requesting the DMA read, the start address and the other cells, so that the DMA read is requested to the direct memory and cell transmission apparatus together with the DMA request.

The operation of the direct memory read and cell transmission apparatus for an ATM cell segmentation system according to the present invention will be explained with reference to the accompanying drawings.

The read controller 310 requests a PCI memory read by transferring the start address and the byte size of the transmission data of the host memory, which data are transmitted from the cell segmentation circuit 200. When the data is transmitted by the word unit, the data are read from the buffer (not shown) of the PCI interface bus circuit 100 and are transmitted to the alignment unit 320 for thereby storing the data into the cell FIFO unit 340. At this time, since the PCI bus interface circuit 100 receives the data by the 32 bit unit, when the read controller 310 transmits a DMA parameter to the PCI interface bus circuit 100, the start address and the length are converted into the word unit based on the byte unit so that the bytes requested by the cell segmentation circuit 200 are all included, for thereby requesting a memory read. Assuming that the DMA start address of the byte unit and the byte size are $A_B$ and $N_B$, respectively, the DMA start word address $A_W$ and the word size $N_W$ which are requested by the PCI interface bus circuit 100 are determined as follows.

Temp<=A(1 downto 0)+N+3;

$N_W$<=2 bit shift right logical of Temp;

$A_W$<=2 bit shift right logical of Byte Address.

The read controller 310 checks the flag which represents that there is not a PCI read buffer data and continuously reads the PCI buffer (not shown) until all words are transmitted to the alignment unit 320. When the word data which are not aligned are transmitted to the alignment unit 320, the start position (offset) and the byte size of each byte obtained by each word are computed and then transmitted together with an enable signal.

In the case of the first word, the offset value of the start position of the byte becomes lower two bits of the byte start address AB, and thereafter it becomes "00".

In addition, in the case of the first word, the information of the byte size is obtaining by subtracting the lower two bits of the DMA request start byte address $A_B$ from 4, and in the case of the last word, the remaining byte size becomes the output byte size, and in the case of the remaining values, it becomes 4. The read controller 310 initializes the internal byte counter (not shown) to $N_B$ before the data is read from the PCI buffer. If the remaining byte size is below 3 while the byte size value selected whenever each word is moved is subtracted from the byte counter, it represents the last word. The alignment unit 320 receives the data and the offset by the word unit and the byte size value, gathers a predetermined byte and forms a new word stream.

The alignment unit 320 extracts a predetermined byte from the data of the word unit transferred from the PCI bus interface circuit 100 together with the enable signal and offset signal and the byte size, aligns the thusly extracted bytes, and generates a 32 bit word data for thereby outputting the data. The alignment unit 320 processes the data whenever the enable signal is inputted from the read controller 310, so that it means that the data inputted should not be continuously inputted.

In the case that one word is generated, when the word data is outputted to the cell FIFO unit 340, a write signal is outputted for one clock, so that the aligned word data is written into the cell FIFO unit 340. In the case that there are byte data which are not formed to the word in the alignment unit 320, a flag which indicates the remaining byte is read is externally outputted. In the data which are not formed to the word, the upper portion is padded to "0" and then the data are stored in a right aligned state. At this time, when an extraction request signal (push) is externally inputted, the internal data which is not formed to the word form is outputted to the cell FIFO unit 340 together with the write signal.

When the read controller 310 reads the data from the PCI bus interface circuit 100, writes into the cell FIFO unit 340 and then requests a cell transmission, in the case that there are bytes in the alignment unit 320, the alignment unit 320 transmits the remaining bytes to the cell FIFO unit 340 and inserts the trailer of the CPCS-PDU together with a header, if necessary, the computation values of the CRC32 and CRC10 of the error detecting code generator 350, so that the ATM cell and the DMA completion signal are transmitted to the cell segmentation circuit 200.

If the read controller 310 requests a transmission, the cell transmitter 330 includes information for checking whether the ATM cell header, AAL and DMA data include a header as an information used for completing the cell transmission and DMA completion, and in the case of AAL 5, it is determined that the cell is the last cell of the CPCS-PDU. The computation value of the CRC32, the value of the trailer used when the cell is the last cell of the CPCS-PDU, and an information used for determining whether the cell is transmitted upon completing the configuration of the ATM cell. Namely, the ATM cell is configured using the above-described information and then is transmitted to the cell segmentation circuit 200. If there is a stop request, the cell transmitter 330 clears the data of the alignment unit 320 and the cell FIFO unit 340 and then completes the DMA. In addition, in the case of AAL 5, upon completing the DMA, an intermediate computation result of the CRC32 code is transmitted. The cell transmission controller 330 reads 12 words in the case of AAL 5 when the cell is not a EPO (End Of Packet) with respect to the cell payload portion and reads 10 words in the case of EOP cell.

The cell FIFO unit 340 receives a write signal from the alignment unit 320 and stores the aligned word data into the interior, and outputs the data of the interior when the cell transmitter 330 transmits a read signal. At this time, if there is not data in the interior, when a read signal is inputted, the signals having zero values are outputted for thereby implementing a padding operation.

The operation of the direct memory read and cell transmission apparatus for an ATM cell segmentation system will be explained with reference to FIGS. 1 through 5.

Figure 2:
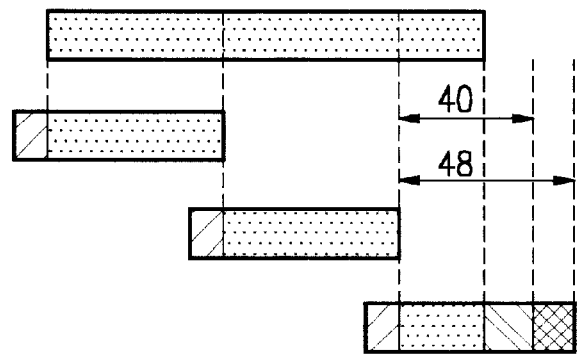
FIG. 2 is a view illustrating a procedure for segmenting the contents of a buffer with respect to an AAL type 5 according to the present invention.
Figure 2:
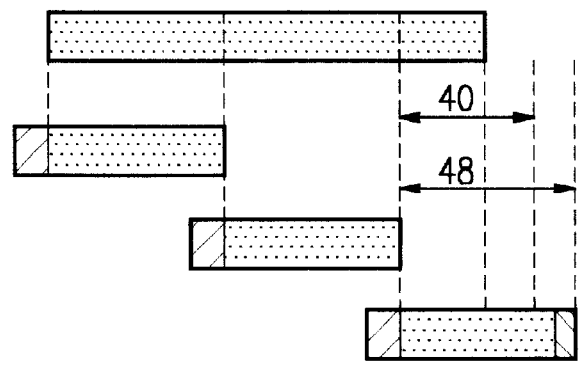
Figure 2:
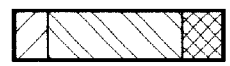

FIG. 2 illustrates a procedure for segmenting the contents of a buffer with respect to the AAL 5.

As shown in FIG. 2, if the bytes remaining in the current buffer is over 48, 48 bytes are requested. In the case that the current buffer is the final buffer of the packet, if the size of bytes is smaller than 40, the DMA read is requested with respect to the remaining bytes for thereby representing the EOP (End Of Packet) cell. At this time, the direct memory read and cell transmission apparatus 300 adds the padding bytes from the requested bytes to 40 bytes, the trailer and CRC32 (Cylic Redundancy Check 32) for thereby forming a cell and then transmitting the same. However, if the current buffer is the final buffer of the packet, and the size of the remaining buffer is larger than 40 and smaller than 48, the DMA read is requested with respect to the remaining bytes, and the EOP cell is not indicated. In this case, the size of the bytes which remain in the buffer after reading the DMA is 0, and the descriptor of the buffer is not returned to the non-useable region. When the above-described connection is again implemented, the DMA read and cell are requested with respect to 0 byte. The direct memory read and cell apparatus 300 pads 40 bytes and adds the trailer and CRC32 for thereby forming cells and transmitting the same.

In the present invention, when the cell segmentation circuit 200 process the above-described operation, the current buffer may not be the final buffer of the CPCS-PDU, and the size of the remaining bytes may be smaller than 48. In this case, the cell segmentation circuit 200 turns its service to the next time service when the following buffer is not connected with the virtual channel (VC) table. If the following buffer is already connected with the VC table for thereby implementing a predetermined service, it is assumed that one cell is formed in the case that the data of the next buffer is included, so that the DMA read is requested with respect to the remaining bytes in the current buffer, and then the buffer descriptor is returned to the non-usable region, and the DMA read is secondarily requested with respect to the remaining bytes in the following buffer. In this case, it is indicated through the cell_not_request that cell is not requested with respect to the previous DMA request. The above-described operation is explained in FIG. 3.

Figure 3:
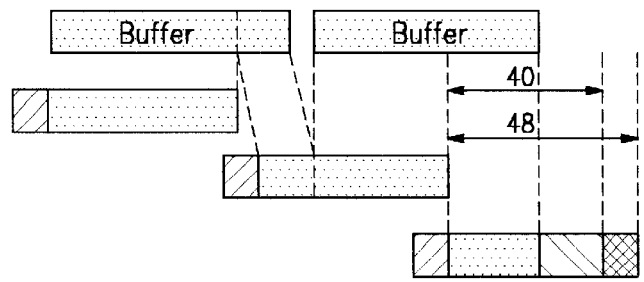
FIG. 3 is a view illustrating a procedure for implementing a split direct memory access for the contents of a buffer with respect to an AAL type 5 according to the present invention.
Figure 3:
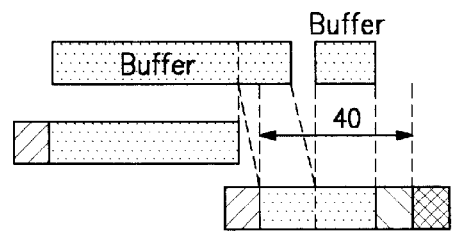
Figure 3:
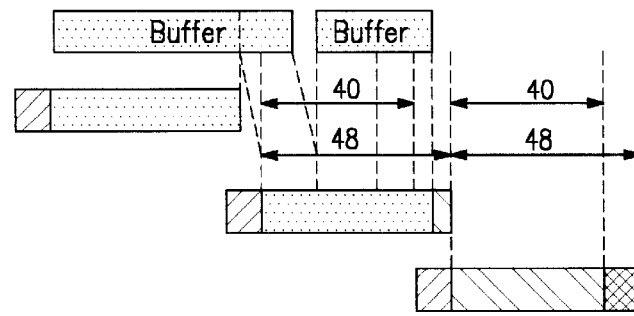

FIG. 3 illustrates the procedure of the split direct memory access for processing the contents of the buffer with respect to the AAL type 5.

As shown in FIG. 3, the following buffer may be or not be the final buffer of the CPCS-PD packet. If the following buffer is the final buffer, the buffer has a predetermined amount of the data by summing the data read from the previous buffer for thereby forming 48 bytes, or even though the bytes of the following buffers are summed, 48 bytes may not be formed. In this case, when summing the bytes again, the summed bytes may exceed 40 or not exceed 48. In this manner, in the case that the data of the previous buffer and the following data are summed for thereby forming one cell, when the data of the previous buffer is requested, the cell_not_request is asserted for thereby indicting that the cell is not requested. In a state that the cell_not_request is asserted, the direct memory read and cell transmission apparatus 300 stores the data read from the PCI bus interface circuit 100 and stops the DMA request with respect to the DMA request. The remaining bytes requested in the following DAM request is obtained and stored. In addition, the cell is formed and transmitted for thereby terminating the DMA request.

In addition, when the cell segmentation circuit 200 processes a predetermined buffer, in the case that the control information of the buffer descriptor is requested to stop, namely, if there is a request for stopping the splitting activity of the CPCS-PDU packet which is being split by the host processor (not shown), the direct memory read and cell transmission apparatus 300 is requested to stop. At this time, the formal DMA request is performed. In the case of the stop request, the direct memory read and cell transmission apparatus 300 clears the data stored in the interior and completes a transaction.

FIGS. 4A through 4C illustrate input/output signals of the alignment unit of FIG. 1.

As shown in FIGS. 4A through 4C, there are shown a data signal transferred from the PCI bus interface circuit 100, an offset signal value and a byte size when the alignment unit 320 reads 17 bytes (a) from the inputted PCI address of BA0045 and 16 bytes (b) from 79205C. In addition, there is shown a word stream (c) outputted from the alignment unit 320 to the cell FIFO unit 340.

Figure 5:
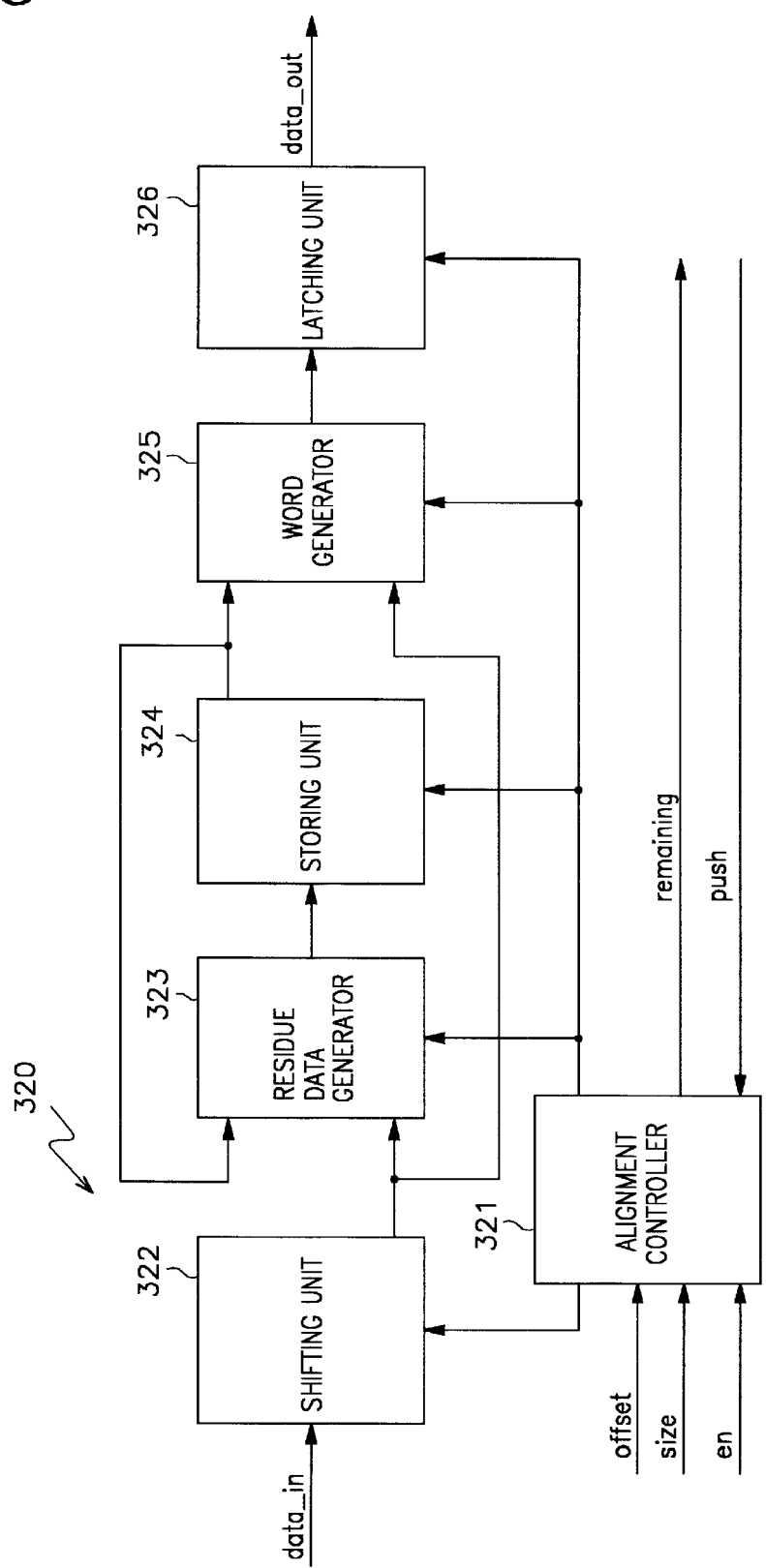
FIG. 5 is a block diagram illustrating the alignment unit of FIG. 1 according to the present invention.

FIG. 5 illustrates the alignment unit of FIG. 1.

As shown in FIG. 5, the alignment unit includes an alignment controller 321 for outputting a control signal for controlling an alignment state of the data using an output signal from a read controller 310, a shifting unit 322 for shifting the externally transferred data in accordance with a control signal from the alignment controller 321, a residue data generator 323 for outputting a residue data of the next cycle using an output signal from the circulating shifting unit 322 and the signal circulated from the storing unit 324 in accordance with a control signal from the alignment controller 321, a storing unit 324 for storing a residue data from the residue data generator 323 in accordance with a control signal outputted from the alignment controller 321, a word generator 325 for outputting a word data using an output signal from the shifting unit 322 and an output signal from the storing unit 324 in accordance with a control signal outputted from the alignment controller 321, and a latch unit 326 for latching the word data outputted from the word generator 325 and outputting to the cell FIFO unit 340 in accordance with a control signal outputted from the alignment controller 321.

The operation of the alignment unit of FIG. 1 will be explained.

The alignment controller 321 computes an information which is used for determining whether a new word is formed, an information concerning the data obtaining by the residue data generator 323 for determining the amount of data shifted by the shifting unit 322, and an information which is obtained based on the data transferred from the storing unit 324 for forming a word by the word generator 322 and the input data shifted through the shifting unit 322 using the size of the bytes remaining in the current storing unit 324, the offset value of the data which is currently being inputted and the size of the bytes and then transmits the thusly computed data to the shifting unit 322, the residue data generator 323, the storing unit 324, the word generator 325 and the latching unit 326, respectively. In addition, if the bytes remain in the storing unit 324, the alignment controller 321 informs the information remaining in the storing unit 324 to the external cell transmission unit 330. If the cell transmission unit 330 requests a discharge of the remaining bytes using a push signal, the remaining bytes are discharged.

The shifting unit 322 circularly shifts the data transferred from the PCI bus interface circuit 100 in accordance with an instruction of the alignment unit 321 as much as the byte unit and outputs to the residue data generator 323 and the word generator 325. The residue data generator 323 generates a residue data for the next cycle using the data transferred from the shifting unit 322 and the previously remaining data. The storing unit 324 stores the data which are not formed to the word in a right aligned state in accordance with a control signal outputted from the alignment controller 321. Thereafter, the word generator 325 outputs the word data to the latching unit 326 using the output signal from the shifting unit 322 and the output signal from the storing unit 324 in accordance with a control signal outputted from the alignment controller 321, and the latching unit 326 latches the word data outputted from the word generator 325 and outputs to the cell FIFO 340 in accordance with a control signal outputted from the alignment controller 321.

As described above, in the direct memory read and cell transmission apparatus for an ATM cell segmentation system according to the present invention, the segmentation circuit transfers the address and size for the start of the DMA by the byte unit. When a predetermined information is provided, and a DMA read is requested, the data is transferred through the bus of the word unit such as the PCI interface, and then necessary bytes are obtained for thereby forming a 32 bit word stream, so that the ATM cell of a 32 bit×12 word form and transfers to the lower circuit. Therefore, when the segmentation circuit processes the buffer, all data are computed by the byte unit, and in an application program, the data are not obtained for transmitting the data to the ATM cell, so that it is possible to enhance the processing capability.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A direct memory read and cell transmission apparatus for an ATM cell segmentation system, comprising:

a read control means for requesting a PCI memory read using a start address and byte size of an external transmission data of a host memory and reading and transferring a data from a peripheral component internal access interface;

an alignment unit for extracting predetermined bytes from word unit data externally transmitted together with an output signal from the read control means and aligning the same, said alignment unit including, a first combining circuit for circularly shifting input data;

a residue register for storing bytes which are not formed to a word in a right aligned state;

a register for latching the word data;

a second combining circuit for selecting predetermined data using contents of said residue register and the shifted input data from the first combining circuit to form a next residue register value;

a third combining circuit for selecting predetermined data using the residue register value and the shifted input data to thereby form a new word; and a controller for outputting a control signal used to control said residue register, said register, and said first, second and third combining circuits;

a cell transmission means for transmitting any bytes remaining in the alignment unit in accordance with a cell transmission request signal from the read control means;

a cell FIFO unit for storing the aligned word data in accordance with a write signal from the alignment unit and outputting the stored data in accordance with a read signal outputted from the cell transmission means;

an error detecting code generating means for detecting an error of the signal outputted from the cell transmission means; and a selection means for selectively outputting an external signal, an output signal from the FIFO unit and an output signal from the cell transmission means in accordance with a selection signal from the cell transmission means.

2. The apparatus of claim 1, wherein said cell transmission means reads 12 word based on FIFO with respect to a cell payload when a cell is not an EOP cell in the case of AAL5, reads 10 word based on the FIFO in the case of the EOP cell, forms a cell by combining a trailer and a CRC32, so that the FIFO transmits a padding information in an empty state.

3. The apparatus of claim 1, wherein said alignment unit receives an external enable signal and offset and size values which indicate a start position of a 32 bit data and a predetermined byte and a byte size, obtains a predetermined byte and forms a 32 bit word.

4. A direct memory and cell transmission apparatus for an ATM cell segmentation system having a function for receiving a data from a host memory and forming an ATM cell, comprising:

a segmentation circuit for reading/writing an information from a local memory, interpreting the information, and extracting identifying information used for combining the information and the cell used for the DMA; and a DMA read and cell combining circuit for receiving the identifying information used for the DMA and information used for the cell combining operation from the segmentation circuit, performing a DMA reading operation, generating a cell using the data transmitted from the host memory and used for the cell combining operation and transferring to the segmentation circuit, said DMA read and cell combining circuit including, a DMA request transfer and PCI buffer read circuit for receiving a DMA request, transferring the request to the PCI circuit, and reading host data from a buffer in the PCI circuit when the host data is inputted from the host memory;

a word alignment circuit for receiving word data from the DMA request transfer and PCI buffer read circuit, and an offset and size information of a predetermined byte, extracting a predetermined byte used for a cell configuration and aligning the word data;

a cell FIFO unit for receiving the aligned word data from the word alignment circuit;

a cell transmission circuit for receiving a cell transmission or DMA completion request instruction from the DMA request transfer and PCI buffer read circuit, reading the aligned word data received from the cell FIFO unit, and multiplexing a cell header, trailer and CRC value to form a cell.

5. The apparatus of claim 4, wherein said cell transmission circuit reads 12 word from the FIFO with respect to the cell payload in the case that the cell is not an EPO cell based on the AAL5, reads 10 word from the FIFO in the case of EOP cell and combines the trailer and CRC32 for thereby forming a cell, and said FIFO unit outputs a padding information in the empty state.

6. The apparatus of claim 4, wherein said word alignment circuit receives an external enable signal and offset and size values indicating a start position and size of the byte, gathers a predetermined byte, and forms a 32 bit word.

7. The apparatus of claim 6, wherein said word alignment circuit includes:

a residue register for storing the bytes which are not formed to the word in a right alignment state;

a register for latching the data of the word form;

a first combining circuit for circularly shifting the data inputted;

a second combining circuit for selecting a predetermined data using the contents of the residue register and the shifted input data from the first combining circuit to form a next residue register;

a third combining circuit for selecting a predetermined data using the contents of the residue register and the shifted input data and forming a value of the next residue register;

a fourth combining circuit for selecting a predetermined data using the value of the residue register and the shifted input data and forming a new word; and a controller for outputting a control signal used to control said residue register, said register, and said first, second, third and fourth combining circuits.

8. The apparatus of claim 4, wherein said PCI read circuit checks an empty signal of the PCI buffer, reads a data whenever the state is not empty, computes the start position and size of the byte of the word and transfers to the alignment circuit.

9. The apparatus of claim 4, wherein said DMA read circuit has an aborting function.

10. A direct memory read and cell transmission apparatus for an ATM cell segmentation system having a PCI interface unit and a cell segmentation circuit, comprising, a read controller, coupled to said PCI interface unit and to said cell segmentation circuit, for requesting a PCI memory read using a start address and byte size from a host memory;

an alignment unit for extracting predetermined bytes from word unit data transferred from said PCI interface unit, said alignment unit including, a shifting unit, coupled to said PCI interface unit, for receiving and shifting input data from said PCI interface unit;

an alignment controller, coupled to said read controller and to said shifting unit, for receiving an enable signal, an offset signal and a byte size from said read controller, said alignment controller for computing information used to determine whether a new word is formed and for computing and controlling an amount of data shifted by said shifting unit;

a word generator, coupled to said shifting unit and to said alignment controller, for outputting word data using an output signal from said shifting unit and in accordance with a control signal received from said alignment controller;

a residue data generator, coupled to said shifting unit and to said alignment controller, for outputting a residue data of a next cycle using an output signal from said shifting unit;

a storing unit, coupled to said alignment controller, said word generator and said residue data generator, for storing a residue data from the residue data generator in accordance with a control signal from said alignment controller; and a latching unit, coupled to said alignment controller and to said word generator, for latching word data received from the word generator and for providing an output in accordance with a control signal from said alignment controller;

a cell FIFO unit coupled to said alignment unit for receiving the output from said latching unit and, in response to a write signal from said alignment unit, for storing aligned word data to said FIFO unit; and a cell transmitter coupled to said PCI interface unit, said cell segmentation circuit, said alignment unit, and said cell FIFO, said cell transmitter providing a read signal to said cell FIFO for outputting said stored data.

11. The apparatus of claim 10, wherein said cell FIFO outputs zero values in response to receiving the read signal in an absence of stored data.

12. The apparatus of claim 10, further comprising:

an error detecting code generator coupled to said cell transmitter for detecting an error in a signal output from said cell transmitter, said error detecting code generator including CRC32 and CRC10.

* * * * *